(12) United States Patent
Kataoka et al.

(10) Patent No.: US 9,746,741 B2
(45) Date of Patent: Aug. 29, 2017

(54) OPTICAL MODULATOR

(71) Applicant: Sumitomo Osaka Cement Co., Tokyo (JP)

(72) Inventors: Toshio Kataoka, Tokyo (JP); Katsutoshi Kondou, Tokyo (JP); Junichiro Ichikawa, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/780,040

(22) PCT Filed: Mar. 13, 2014

(86) PCT No.: PCT/JP2014/056685
§ 371 (c)(1),
(2) Date: Sep. 25, 2015

(87) PCT Pub. No.: WO2014/156684
PCT Pub. Date: Oct. 2, 2014

(65) Prior Publication Data
US 2016/0033848 A1  Feb. 4, 2016

(30) Foreign Application Priority Data
Mar. 26, 2013 (JP) .................... 2013-064913

(51) Int. Cl.
*G02F 1/035* (2006.01)
*G02F 1/225* (2006.01)
(Continued)

(52) U.S. Cl.
CPC ............ *G02F 1/225* (2013.01); *G02F 1/0316* (2013.01); *G02F 1/2255* (2013.01); *G02F 2001/212* (2013.01); *G02F 2201/121* (2013.01)

(58) Field of Classification Search
CPC ...................................................... G02F 1/225
See application file for complete search history.

(56) References Cited

U.S. PATENT DOCUMENTS

2002/0131665 A1* 9/2002 Sriram .................... G02F 1/225
                                                              385/2
2003/0007711 A1   1/2003 Sugamata et al.
(Continued)

FOREIGN PATENT DOCUMENTS

JP    2000-275587 A     10/2000
JP    2000275587 A  *  10/2000
(Continued)

OTHER PUBLICATIONS

International Search Report of PCT/JP2014/056685 mailed Apr. 8, 2014.
(Continued)

*Primary Examiner* — Sung Pak
*Assistant Examiner* — Hoang Tran
(74) *Attorney, Agent, or Firm* — Taft Stettinius & Hollister LLP

(57) ABSTRACT

An aspect of the present invention is an optical modulator including a substrate, a plurality of optical waveguides, and a plurality of modulation electrodes provided on the substrate in order to modulate light propagating through the optical waveguides. The modulation electrodes include signal electrodes, to which modulation signals are supplied, and ground electrodes. The signal electrodes include first and second signal electrodes. The ground electrodes include a first ground electrode provided between the first and second signal electrodes, a second ground electrode provided on the opposite side of the first signal electrode from the first ground electrode adjacent to the first signal electrode, and a third ground electrode provided on the opposite side of the second signal electrode from the first ground electrode adjacent to the second signal electrode. A concave groove is formed in each of the first to third ground electrodes.

9 Claims, 10 Drawing Sheets

(51) Int. Cl.
*G02F 1/03* (2006.01)
*G02F 1/21* (2006.01)

(56) References Cited

U.S. PATENT DOCUMENTS

| | | |
|---|---|---|
| 2005/0157970 A1 | 7/2005 | Sugamata et al. |
| 2010/0209040 A1 | 8/2010 | Kawano et al. |
| 2011/0019956 A1 | 1/2011 | Sugiyama |

FOREIGN PATENT DOCUMENTS

| | | |
|---|---|---|
| JP | 2001255501 A | 9/2001 |
| JP | 2007033894 A | 2/2007 |
| JP | 2009075200 A | 4/2009 |
| JP | 2011028014 A | 2/2011 |
| JP | 2012098744 A | 5/2012 |
| JP | 2012212028 A | 11/2012 |

OTHER PUBLICATIONS

K. Prosyk, et al., "Tunable InP-based Optical IQ Modulator for 160Gb/s", 37th European Conference and Exhibition on Optical Communication 2011, Postdeadline Papers, Sep. 18, 2011, p. 1-3.

* cited by examiner

OPTICAL MODULATOR

TECHNICAL FIELD

The present invention relates to an optical modulator.

BACKGROUND ART

Conventionally, an optical modulator having an optical waveguide structure in which an optical waveguide is formed on a substrate has been known. A Mach-Zehnder interference type optical modulator including a plurality of optical waveguides has a configuration in which light waves propagating through different optical waveguides are combined, and the intensity of light after combining is determined by the difference in the amount of phase change between light waves propagating through the optical waveguides (for example, refer to Patent Literature No. 1). By changing the difference in the amount of phase change, it is possible to change the output intensity of the optical modulator.

CITATION LIST

Prior Art

Patent Literature

[Patent Literature No. 1] Japanese Laid-open Patent Publication No. 2007-33894

SUMMARY OF INVENTION

Problem to be Solved by the Invention

In the Mach-Zehnder interference type optical modulator disclosed in Patent Literature No. 1, a plurality of signal electrodes are provided. Accordingly, when the signal electrodes are disposed close to each other, a phenomenon (crosstalk) in which an electrical signal of a certain signal electrode is received by other signal electrodes becomes a problem. Particularly in the case of a broadband signal including high-frequency components of 10 GHz or more, it becomes a more serious problem since it is difficult to correct, in real time, the degradation of a signal and signal error due to crosstalk. In order to suppress such crosstalk, signal electrodes of the optical modulator are provided so as to maintain a predetermined distance therebetween. Meanwhile, in recent years, in order to construct commercial network equipment occupying a significantly reduced space, further miniaturization is required for the optical modulator whose capacity is increasing. That is, an optical modulator that is reduced in size while suppressing crosstalk between signal electrodes has been demanded.

An aspect of the present invention is to provide an optical modulator that is reduced in size while suppressing the crosstalk between signal electrodes.

Means for Solving Problem

An optical modulator according to an aspect of the present invention is an optical modulator including a substrate, a plurality of optical waveguides, and a plurality of modulation electrodes provided on the substrate in order to modulate light waves propagating through the optical waveguides. The modulation electrodes include signal electrodes, to which modulation signals are supplied, and ground electrodes. The signal electrodes include first and second signal electrodes. The ground electrodes include a first ground electrode provided between the first and second signal electrodes, a second ground electrode provided on the opposite side of the first signal electrode from the first ground electrode provided adjacent to the first signal electrode, and a third ground electrode provided on the opposite side of the second signal electrode from the first ground electrode provided adjacent to the second signal electrode. A concave groove is formed in each of the first to third ground electrodes.

In such an optical modulator, the first ground electrode is provided between the first and second signal electrodes, and the second and third ground electrodes are provided on the opposite sides of the first and second signal electrodes from the first ground electrode. In addition, a concave groove is formed in each of the first to third ground electrodes. By forming such a concave groove in the ground electrode, the surface area of the ground electrode is increased. The ground electrode having an increased surface area due to the concave groove can effectively terminate the electric lines of force from each signal electrode compared with a conventional ground electrode in which no concave groove is formed. Accordingly, since the distance between signal electrodes for suppressing crosstalk can be narrowed down compared with that in the related art, it is possible to miniaturize the optical modulator. That is, it is possible to suppress the crosstalk between signal electrodes and to achieve miniaturization.

The groove may be formed on an end of each of the first to third ground electrodes. Since the groove is formed on the end of each ground electrode, a portion (groove) having a large surface area in the ground electrode is formed at a position close to each signal electrode. As the portion is located at a position closer to the signal electrode, the electric lines of force becomes higher. However, it is possible to terminate the electric lines of force more effectively by forming the groove at a position close to each signal electrode.

A distance between the first and second signal electrodes may be 300 µm or less. In a broadband optical modulator using lithium niobate (LiNbO$_3$; hereinafter, referred to as "LN") as a substrate, the density of electric lines of force that come out from the signal electrode and are terminated by the ground electrode is usually reduced at a location spaced apart by 300 µm to 500 µm from the signal electrode where the electric lines of force is originated, and the electric field strength is reduced. Therefore, in the related art, it has been necessary to set the distance between signal electrodes to at least about 300 µm. However, in the above-described optical modulator in which the concave groove is formed in the ground electrode, the distance between signal electrodes can be set to 300 µm or less since the surface area of the ground electrode is large. That is, it is possible to miniaturize the optical modulator.

Each of the modulation electrodes may be a coplanar electrode or a coplanar strip line electrode. An aspect of the present invention can be reliably carried out by using a coplanar electrode, which is formed by signal electrodes and ground electrodes disposed so as to interpose the signal electrodes therebetween, or a coplanar strip line electrode as a modulation electrode.

A distance between the signal electrode and the ground electrode adjacent to each other may be 25 µm or more. In order to perform optical modulation corresponding to the high frequency of 10 GHz or more, it is necessary to use an electrode structure in which the loss of a high-frequency signal is small. In order to do so, it is effective to adopt a coplanar electrode having a configuration in which the distance (gap) between the signal electrode and the ground electrode is large. In the case of the optical modulator using the LN for the substrate, the gap between the signal electrode and the ground electrode is generally set to 25 μm or more. However, in the case of a configuration in which the gap between the signal electrode and the ground electrode adjacent to each other is wide, the amount of signal that leaks is large. Accordingly, the problem of crosstalk becomes significant. In this configuration, even if the gap between the signal electrode and the ground electrode is 25 μm or more, it is possible to obtain a sufficient crosstalk suppression effect. Accordingly, even when an electrical signal in a microwave frequency band of 10 GHz or more flows through the signal electrode, it is possible to effectively suppress the crosstalk.

The groove may extend in a direction parallel to a traveling direction of light waves propagating through the optical waveguide. In this case, the electric lines of force from the signal electrode can be effectively terminated by the groove. The width of the groove may not necessarily be fixed. However, in the case of a fixed width and a fixed cross-sectional shape, it is easier to execute the characteristic design of electrodes, and it is easy to prevent the loss of the propagation signal due to impedance discontinuities.

The groove may not penetrate the ground electrode. In addition, the groove may penetrate the ground electrode. In any case, the electric lines of force from the signal electrode can be effectively terminated by the groove due to an increase in the surface area of the ground electrode.

The groove may be formed at predetermined periods in a direction parallel to a traveling direction of light propagating through the optical waveguide, and a formation period of the groove may be shorter than a wavelength of the modulation signal. By arranging grooves periodically, the characteristic design of electrodes is executed easily and it is possible to prevent the loss of the propagation signal due to impedance discontinuities.

Advantageous Effects of Invention

According to an aspect of the present invention, it is possible to provide an optical modulator that is reduced in size while suppressing crosstalk between signal electrodes.

MODE FOR CARRYING OUT THE INVENTION

Hereinafter, embodiments of the present invention will be described in detail with reference to the accompanying diagrams.

Figure 1:
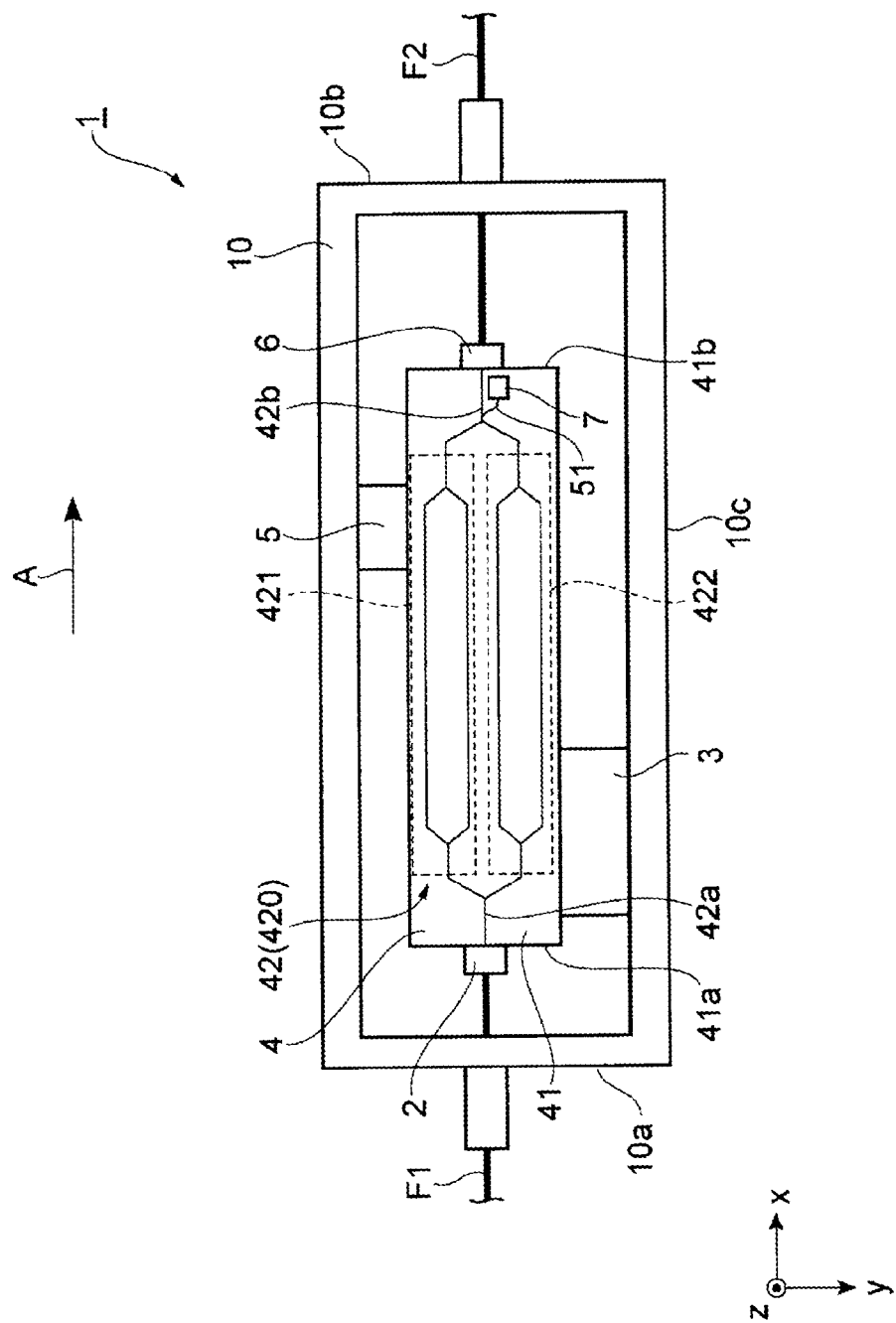
FIG. 1 is a diagram schematically showing the configuration of an optical modulator according to an embodiment.

FIG. 1 is a diagram schematically showing the configuration of an optical modulator according to an embodiment. As shown in FIG. 1, an optical modulator 1 is a device that modulates input light launched by an optical fiber F1 and outputs the modulation light to an optical fiber F2. The optical modulator 1 may include an optical input port 2, a relay unit 3, an optical modulating element 4, a terminator 5, an optical output port 6, a monitor unit 7, and a case 10. Although the optical modulator 1 shown in FIG. 1 is a so-called Z-cut optical modulator, the optical modulator according to the present embodiment may be a so-called X-cut optical modulator.

The case 10 is a box-shaped member extending in one direction (hereinafter, referred to as a "direction A"), and is formed of stainless steel, for example. The case 10 has one end surface 10a and the other end surface 10b that are both end surfaces in the direction A. A hole for the insertion of the optical fiber F1 is provided on the end surface 10a. A hole for the insertion of the optical fiber F2 is provided on the other end surface 10b. For example, the optical input port 2, the relay unit 3, the optical modulating element 4, the terminator 5, the optical output port 6, and the monitor unit 7 are housed in the case 10.

The optical input port 2 supplies the input light launched by the optical fiber F1 to the optical modulating element 4. The optical input port 2 may include a support member for supporting a bonding between the optical fiber F1 and the optical modulating element 4.

The relay unit 3 relays a modulation signal, which is an electrical signal supplied from the outside, and outputs the modulation signal to the optical modulating element 4. The relay unit 3 receives a modulation signal, for example, through a modulation signal input connector provided on a side surface 10c of the case 10, and outputs the modulation signal to the optical modulating element 4.

The optical modulating element 4 is a device that converts the input light supplied from the optical input port 2 into modulation light in accordance with the modulation signal output from the relay unit 3. For example, the optical modulating element 4 is an LN optical modulating element. The optical modulating element 4 may include a substrate 41, an optical waveguide 42, and a modulation electrode 43 (not shown in FIG. 1). The substrate 41 contains a dielectric material with an electro-optic effect, such as LN, for example. The substrate 41 extends along the direction A, and has one end 41a and the other end 41b that are both ends in the direction A.

The optical waveguide 42 is provided on the substrate 41. The optical waveguide 42 is, for example, a Mach-Zehnder type optical waveguide, and has a structure suitable to the modulation method of the optical modulating element 4. In this example, the modulation method of the optical modulating element 4 is a differential quadrature phase shift keying (DQPSK) modulation method. In this case, the optical waveguide 42 has a structure in which Mach-Zehnder portions 421 and 422 are provided on the two branch waveguides of a Mach-Zehnder portion 420. That is, an input waveguide 42a of the Mach-Zehnder portion 420 extends along the direction A from the one end 41a of the substrate 41, and is branched and connected to the input end of the Mach-Zehnder portion 421 and the input end of the Mach-Zehnder portion 422. In an output waveguide 42b of the Mach-Zehnder portion 420, waveguides extending from the output end of the Mach-Zehnder portion 421 and the output end of the Mach-Zehnder portion 422 join and extend to the other end 41b along the direction A.

In the optical modulating element 4, input light that is input to the optical modulating element 4 from the optical input unit 2 is branched and input to the Mach-Zehnder portions 421 and 422 by the input waveguide 42a. The input light is modulated in the Mach-Zehnder portions 421 and 422. The modulation light modulated in the Mach-Zehnder portion 421 and the modulation light modulated in the Mach-Zehnder portion 422 are applied with a phase difference of 90° and are combined in the output waveguide 42b, and the combined light is output from the optical modulating element 4.

The terminator 5 is an electrical termination of the modulation signal. The terminator 5 may include a resistor corresponding to each modulation electrode 43 of the optical modulating element 4. One end of each resistor is electrically connected to the modulation electrode 43 of the optical modulating element 4, and the other end of each resistor is connected to the ground potential. The resistance value of each resistor is about 50Ω, for example.

The optical output port 6 outputs the modulation light, which is output from the optical modulating element 4, to the optical fiber F2. The optical output port 6 is provided on the other end 41b of the substrate 41.

The monitor unit 7 monitors the light intensity of radiated light output from the optical modulating element 4. The monitor unit 7 may include a photoelectric conversion element. The photoelectric conversion element is an element for converting an optical signal into an electrical signal. For example, the photoelectric conversion element is a photodiode. The photoelectric conversion element receives radiated light and outputs an electrical signal corresponding to the light intensity of the radiated light to a bias control unit (not shown), for example. The monitor unit 7 may monitor the light intensity of branched light of modulation light. FIG. 1 shows a configuration in which the monitor unit 7 is provided on the substrate 41 and is connected to a waveguide 51 extending from a combining portion in which the waveguides of the Mach-Zehnder portions 421 and 422 join.

Figure 2:
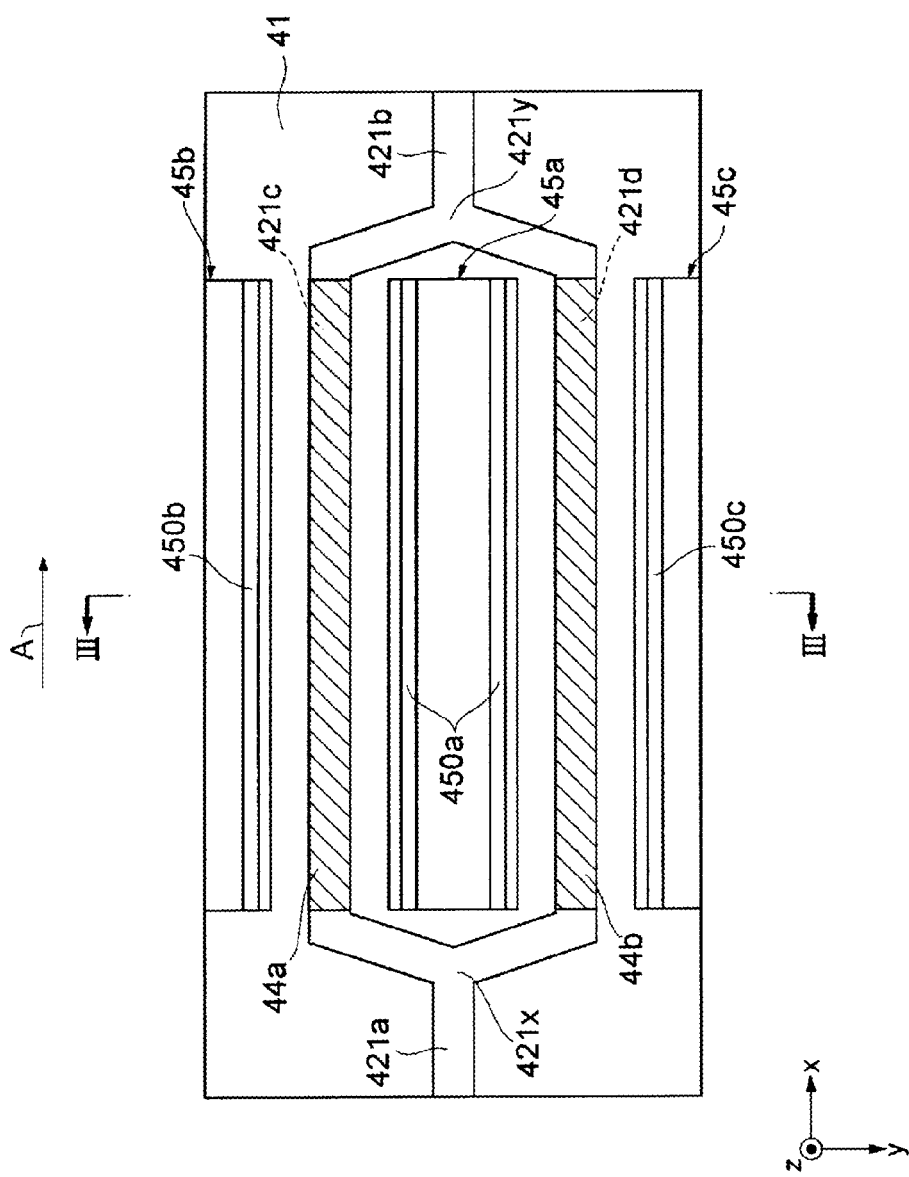
FIG. 2 is a schematic diagram of a Mach-Zehnder portion shown in FIG. 1.
Figure 3:
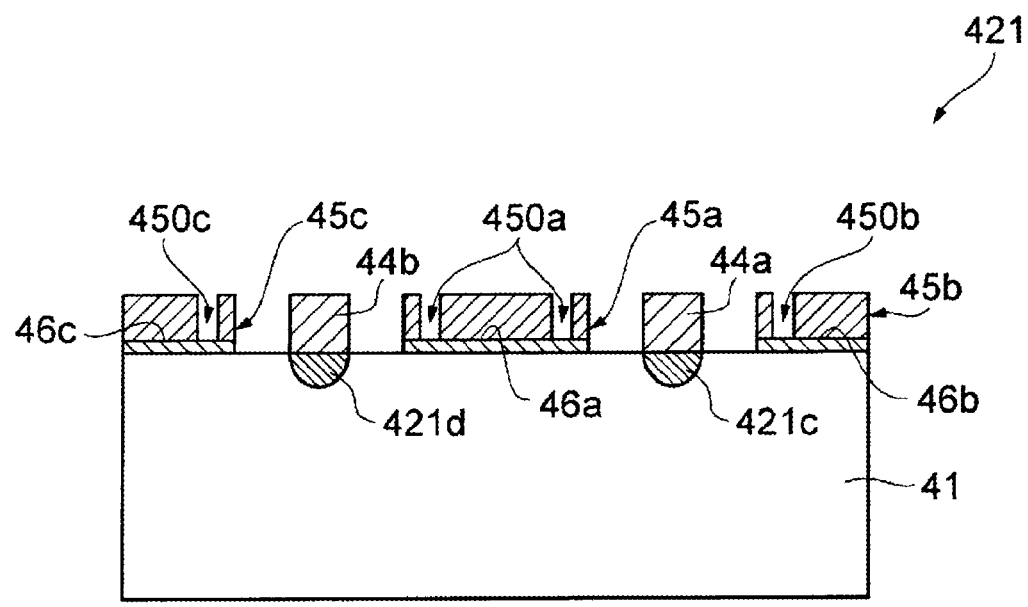
FIG. 3 is a cross-sectional view of the Mach-Zehnder portion shown in FIG. 2 taken along the line III-III.
Figure 3:
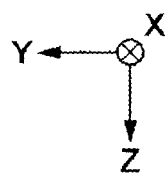
Figure 4:
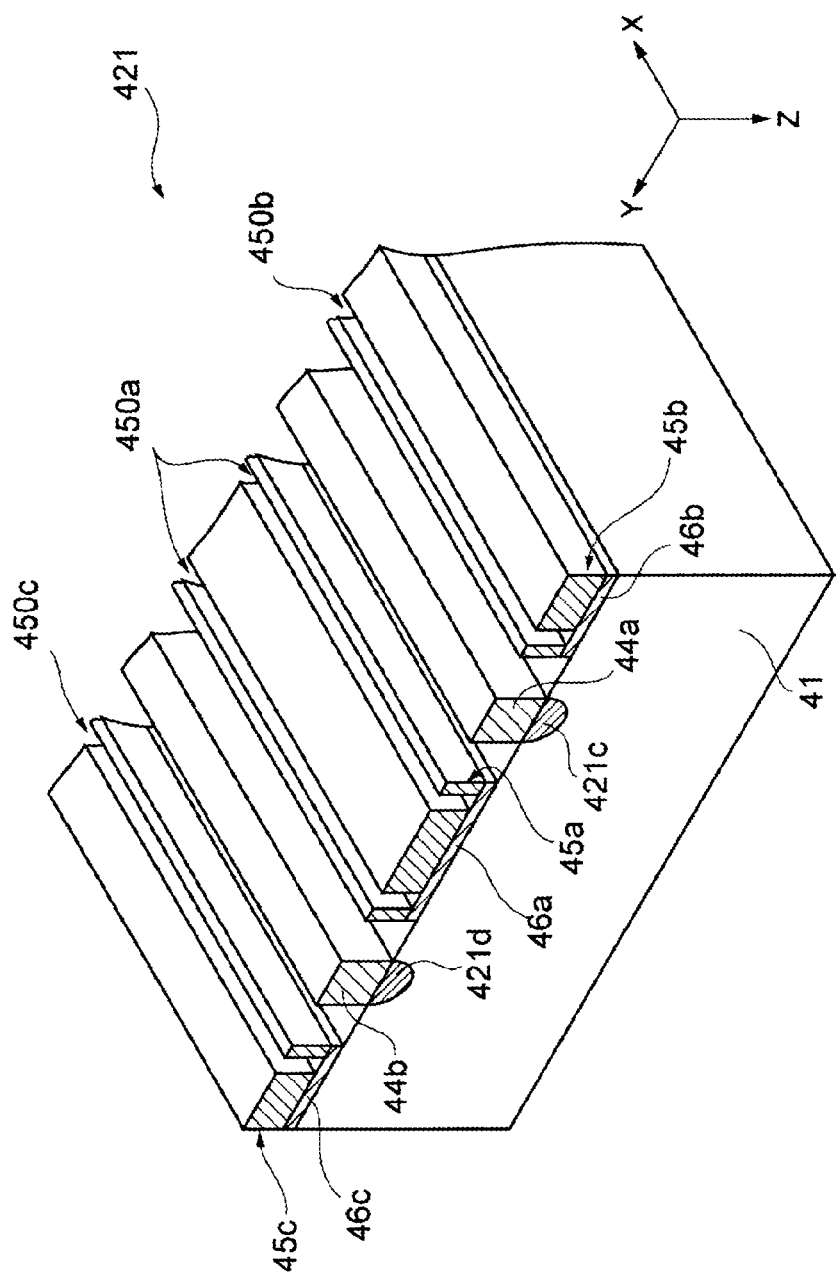
FIG. 4 is a perspective view of the Mach-Zehnder portion shown in FIG. 3.

Next, the detailed configuration of the Mach-Zehnder portion 421 will be described with reference to FIGS. 2 to 4. In addition, the main configuration of the Mach-Zehnder portion 422 is the same as that of the Mach-Zehnder portion 421. FIG. 2 is a schematic diagram of the Mach-Zehnder portion shown in FIG. 1. FIG. 3 is a cross-sectional view of the Mach-Zehnder portion shown in FIG. 2 taken along the line III-III. FIG. 4 is a perspective view of the Mach-Zehnder portion shown in FIG. 3.

As the optical waveguide 42, the Mach-Zehnder portion 421 includes an input waveguide 421a, an output waveguide 421b, and branch waveguides 421c and 421d that are a pair of branched optical waveguides and extend along the direction A. That is, in the optical waveguide 42 of the Mach-Zehnder portion 421, the input waveguide 421a extending along the direction A is connected to the branch waveguides 421c and 421d at a branch point 421x, and the branch waveguides 421c and 421d are connected to the output waveguide 421b extending along the direction A at a joining point 421y.

On the substrate 41, the modulation electrode 43 for modulating the light propagating through the branch waveguides 421c and 421d is provided. From the point of view of broadening the operating bandwidth of the optical modulator 1, a traveling wave type electrode that realizes velocity matching by making an electrical signal and a light wave propagate in the same direction is used as the modulation electrode 43. Specifically, a coplanar electrode including signal electrodes 44a and 44b, a ground electrode 45a disposed between the signal electrodes 44a and 44b, and ground electrodes 45b and 45c disposed so as to interpose the signal electrodes 44a and 44b therebetween is used as the modulation electrode 43. The thickness H of the modulation electrode 43 is designed in accordance with the gap between the signal electrode and the ground electrode, taking the velocity matching conditions and the characteristic impedance into consideration. For example, the thickness H of the modulation electrode 43 is 10 μm to 80 μm. The modulation electrode 43 is made of low-resistance metal, such as gold (Au).

The signal electrodes 44a and 44b are electrodes (not shown) for applying the electric field, which corresponds to the modulation signal output (supplied) from the relay unit 3, to the branch waveguides 421c and 421d, and extend in the direction A similar to the branch waveguides 421c and 421d. The signal electrode 44a that is a first signal electrode is provided on the branch waveguide 421c, and the signal electrode 44b that is a second signal electrode is provided on the branch waveguide 421d. The signal electrodes 44a and 44b do not necessarily need to be provided on the branch waveguides 421c and 421d. The arrangement and number of signal electrodes 44a and 44b are determined in accordance with the direction of the crystal axis of the substrate 41 and the modulation method of the optical modulating element 4. The lengths of the signal electrodes 44a and 44b in the direction A are determined, based on the design of the driving voltage and the amount of induced phase change. In order to miniaturize the optical modulator, the distance between the signal electrodes 44a and 44b in a direction (y direction in the diagram) crossing the direction A (x direction in the diagram) may be, for example, 500 μm or less, or further, 300 μm or less. In addition, an electrical signal of 10 GHz or more is included in the modulation signal supplied to the signal electrode.

The ground electrodes 45a, 45b, and 45c are electrodes that are grounded to have a ground potential, and extend in the direction A similar to the branch waveguides 421c and 421d. The ground electrode 45a is a first ground electrode provided between the signal electrodes 44a and 44b on the substrate 41. The ground electrode 45b is a second ground electrode provided on the substrate 41 so as to be adjacent to the signal electrode 44a and be on the opposite side of the signal electrode 44a from the ground electrode 45a adjacent to the signal electrode 44a. The ground electrode 45c is a third ground electrode provided on the substrate 41 so as to be adjacent to the signal electrode 44b and be on the opposite side of the signal electrode 44b from the ground electrode 45a adjacent to the signal electrode 44b. On the surfaces of the substrate 41 on which the ground electrodes 45a, 45b, and 45c are provided, thin electrodes 46a, 46b, and 46c, which are electrodes that are grounded to have a ground potential similar to the ground electrodes 45a, 45b, and 45c, are provided.

Therefore, the ground electrodes 45a and 45b are coplanar electrodes provided so as to interpose the signal electrode 44a therebetween in a direction (y direction in the diagram) crossing the direction A (x direction in the diagram). The ground electrodes 45a and 45c are coplanar electrodes provided so as to interpose the signal electrode 44b therebetween in a direction (y direction in the diagram) crossing the direction A (x direction in the diagram). The distance between the signal electrode and the ground electrode adjacent to each other (the signal electrode 44a and the ground electrode 45a, the signal electrode 44a and the ground electrode 45b, the signal electrode 44b and the ground electrode 45a, and the signal electrode 44b and the ground electrode 45c) is 25 µm or more.

Between the modulation electrode 43 and the substrate 41, in order to prevent the propagation loss of the light wave due to electrode metal, a buffer layer, which is made of a dielectric material (for example, $SiO_2$) having a lower refractive index than the LN that forms the substrate 41, is formed (not shown). A charge dispersion film made of Si or the like is formed between the modulation electrode 43 and the buffer layer (not shown).

A concave groove is formed in each of the ground electrodes 45a, 45b, and 45c. That is, a groove 450a in the ground electrode 45a, a groove 450b in the ground electrode 45b, and a groove 450c in the ground electrode 45c are respectively formed.

The grooves 450a, 450b, and 450c are formed on the ends of the ground electrodes 45a, 45b, and 45c, respectively, in a direction (y direction in the diagram) crossing the direction A (x direction in the diagram). More specifically, the grooves 450a, 450b, and 450c are formed on the sides of the ground electrodes 45a, 45b, and 45c near the signal electrodes 44a and 44b (ends of the ground electrodes 45a, 45b, and 45c on the signal electrodes 44a and 44b). That is, the groove 450a is formed on the sides of the ground electrode 45a near the signal electrodes 44a and 44b, the groove 450b is formed on the side of the ground electrode 45b near the signal electrode 44a, and the groove 450c is formed on the side of the ground electrode 45c near the signal electrode 44b. Each of the grooves 450a, 450b, and 450c is formed in a single line in a direction parallel to the direction A (x direction in the diagram). Therefore, as shown in FIGS. 2 and 4, in top view (or in perspective view), on both ends of the ground electrodes 45a, 45b, and 45c, each of the grooves 450a, 450b, and 450c is formed in a single line in a direction parallel to the direction A (x direction in the diagram).

The grooves 450a, 450b, and 450c penetrate the ground electrodes 45a, 45b, and 45c, respectively, as shape in depth direction of the concave grooves. Therefore, portions in which the grooves 450a, 450b, and 450c are formed are only the thin electrodes 46a, 46b, and 46c.

Thus, in the optical modulator 1 according to the present embodiment, the ground electrode 45a is provided between the signal electrodes 44a and 44b, the ground electrode 45b is provided on the opposite side of the signal electrode 44a from the ground electrode 45a adjacent to the signal electrode 44a, and the ground electrode 45c is provided on the opposite side of the signal electrode 44b from the ground electrode 45a adjacent to the signal electrode 44b. The concave grooves 450a, 450b, and 450c are formed in the ground electrodes 45a, 45b, and 45c, respectively.

Conventionally, in the optical modulator in which a plurality of signal electrodes, such as a Mach-Zehnder interference type optical modulator, are provided, in order to suppress the phenomenon (crosstalk) in which an electrical signal of a certain signal electrode is received by other signal electrodes, the signal electrodes are provided so as to maintain a predetermined distance therebetween. For this reason, even though miniaturization is desired in order to construct commercial network equipment occupying a significantly reduced space, there has been a limitation on the miniaturization of the optical modulator.

Figure 5:
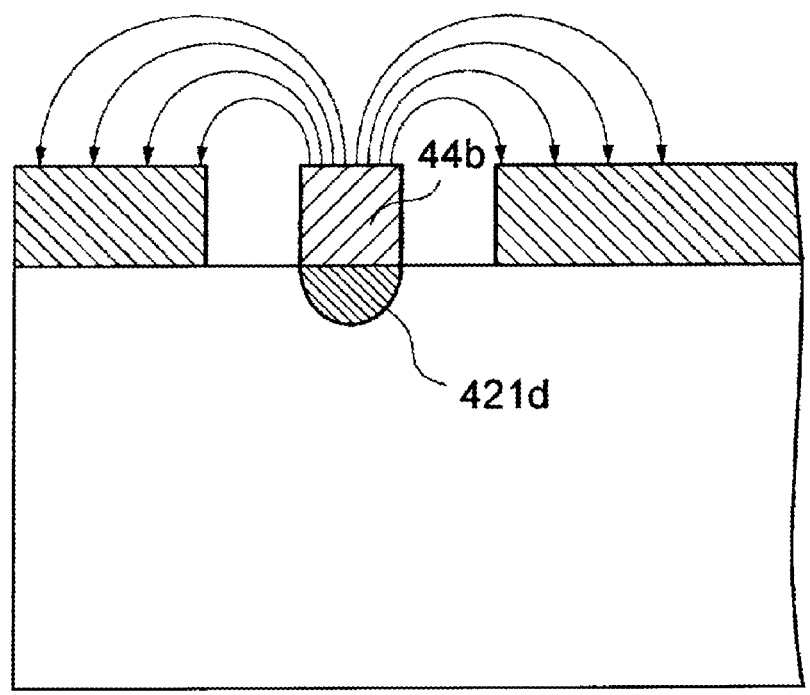
FIG. 5 is a termination image of the electric lines of force in a ground electrode of a conventional optical modulator.
Figure 5:
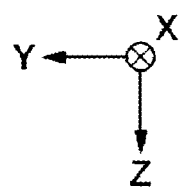
Figure 6:
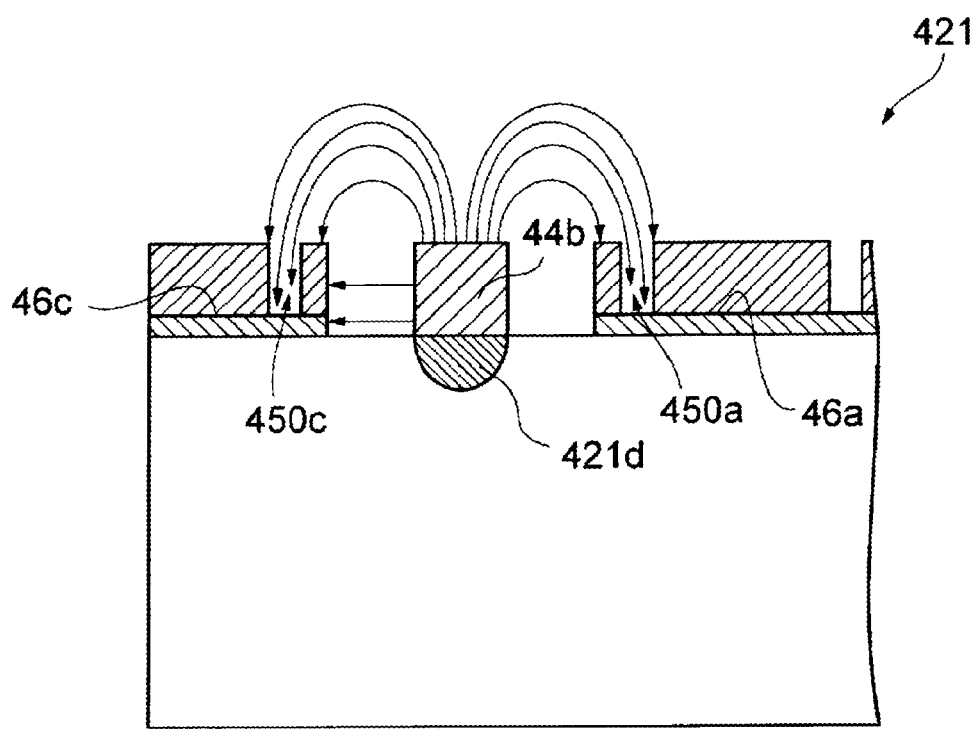
FIG. 6 is a termination image of the electric lines of force in a ground electrode of the optical modulator according to the present embodiment.
Figure 6:
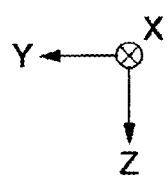

In this respect, in the optical modulator 1 according to the present embodiment, the surface area of each ground electrode is increased due to the concave grooves 450a, 450b, and 450c formed in the ground electrodes 45a, 45b, and 45c. The ground electrodes 45a, 45b, and 45c that have increased surface areas due to the grooves 450a, 450b, and 450c can effectively terminate the electric lines of force from the signal electrodes 44a and 44b (FIG. 6), compared with a conventional ground electrode in which no groove is formed (FIG. 5). FIGS. 5 and 6 are images for explanation, and the illustration of the electric lines of force terminated on the side surface of an electrode and the electric lines of force terminated in the electrode bottom portion through a substrate is omitted.

Specifically, as shown in FIG. 6, the electric lines of force based on the electrical signal of the signal electrode 44a is effectively terminated by the ground electrode 45a having an increased surface area due to the groove 450a and the ground electrode 45b having an increased surface area due to the groove 450b. In addition, the electric lines of force based on the electrical signal of the signal electrode 44b is effectively terminated by the ground electrode 45a having an increased surface area due to the groove 450a and the ground electrode 45c having an increased surface area due to the groove 450c.

Therefore, since the distance between signal electrodes for suppressing the crosstalk can be narrowed down compared with that in the related art, it is possible to miniaturize the optical modulator. That is, it is possible to suppress the crosstalk between signal electrodes and to achieve miniaturization.

In addition, since the grooves 450a, 450b, and 450c are formed on the ends of the ground electrodes 45a, 45b, and 45c, respectively, portions having large surface areas (that is, the grooves 450a, 450b, and 450c) in the ground electrodes 45a, 45b, and 45c are formed at positions close to the signal electrodes 44a and 44b. As the portions are located at positions closer to the signal electrodes 44a and 44b, the electric lines of force becomes higher. Therefore, it is possible to terminate the electric lines of force more effectively by forming the grooves 450a, 450b, and 450c at the position close to the signal electrodes 44a and 44b.

Although the groove 450a greatly contributes to the reduction of crosstalk, a symmetrical structure is easier to design in the design of a coplanar electrode. Accordingly, the grooves 450b and 450c are provided herein for the symmetry in the structure. In addition, a plurality of lines of grooves may be formed. In this case, a higher crosstalk reduction effect is obtained. However, since the characteristic impedance is reduced due to the formation of grooves, a minimum number of grooves required may be formed on the end portion where the installation effect is high, within the acceptable level of crosstalk characteristics, according to the circuit design.

When forming the grooves 450a, 450b, and 450c on the ends of the ground electrodes 45a, 45b, and 45c, the grooves 450a, 450b, and 450c may be formed at positions spaced apart from the ends by the width of the signal electrode or more in terms of ensuring the line-width resolution in a photolithography step and reproducibility in a plating step. The cross-sectional shapes of the grooves 450a, 450b, and 450c are not limited to rectangular shapes as shown in FIG. 4, and may be trapezoidal shapes, U shapes, V shapes, saw tooth waves, and the like. In order to reduce signal loss, a smooth shape is preferable. A structure in which a plurality of smooth concavo-convex grooves, such as U-shaped grooves, are provided and the top surface of each ground electrode has a corrugated plate shape is one of the most effective forms to reduce the crosstalk.

However, in the case of the groove having a smooth cross-sectional structure, such as a U-shaped groove, there is a problem in manufacturing method. The thickness of an electrode of a high-speed and broadband device, such as an optical modulator using the LN for the substrate, is 10 μm to 80 μm as described above. Accordingly, photolithography and plating steps are normally used. In order to form a groove having a smooth cross-sectional shape, such as a U shape, it is necessary to repeat the photolithography and plating steps multiple times. On the other hand, rectangular and trapezoidal grooves can be formed with a smaller number of photolithography and plating steps. For example, the electrode having a configuration shown in FIG. 3 can be formed by two photolithography steps and two plating steps. For the widths of the grooves 450a, 450b, and 450c, narrower shapes are more effective in terms of increasing the surface area. However, the width having almost the same as the signal electrode width or more may be set, ensuring the line-width resolution in the photolithography step and reproducibility in the plating step.

As described above, since the ground electrodes 45a, 45b, and 45c can effectively terminate the electric lines of force from the signal electrodes 44a and 44b, the distance between the signal electrode 44a and 44b can be 300 μm or less. Therefore, in a modulator for a system in which the digital correction of the signal is performed on the receiver side, such as a 100-Gbps digital coherent QPSK modulator, the distance between the signal electrode 44a and 44b can be reduced by about three times the size of the gap between the signal electrode and the ground electrode. Usually, the density of electric lines of force originated by the signal electrode is not reduced as long as apart from the signal electrode by about 300 μm to 500 μm and accordingly the electric field is not reduced. Therefore, the distance between the signal electrodes 44a and 44b needs to be set to approximately 300 μm at a minimum in the related art. However, the optical modulator 1 can be greatly miniaturized.

By forming the coplanar electrode as the modulation electrode 43, in the case of an electrode configuration having a large gap between the signal electrode and the ground electrode, which is suitable for modulation when the electrical signal of 10 GHz or more that is the frequency band of a microwave is a modulation signal, crosstalk is likely to occur in general. In this regard, even if the distances between the signal electrodes 44a and 44b and the ground electrodes 45a, 45b, and 45c adjacent to each other are set to 25 μm or more, it is possible to lower microwave losses for signals in a high frequency band, and it is also possible to suppress crosstalk.

In addition, since the grooves 450a, 450b, and 450c extend in a direction parallel to the traveling direction of light propagating through the branch waveguides 421c and 421d, the electric lines of force from the signal electrodes 44a and 44b can be effectively terminated by the grooves 450a, 450b, and 450c.

The grooves 450a, 450b, and 450c are formed at predetermined periods in a direction parallel to the traveling direction of light propagating through the branch waveguides 421c and 421d. Therefore, by making the formation period of the grooves 450a, 450b, and 450c shorter than the wavelength of the modulation signal, it is possible to suppress the degradation of the electrical characteristics. In the case of a structure in which the grooves 450a, 450b, and 450c are periodically formed, the grooves 450a, 450b, and 450c act as a band pass filter circuit corresponding to a specific frequency. Accordingly, there is a possibility that the specific frequency signal will be influenced by the band pass filter circuit and the signal propagating through the signal electrode will be degraded. The degradation of the modulation signal can be avoided by setting the formation period of grooves to ¼ or less of the wavelength (wavelength of the frequency component in the band pass filter circuit) of the main frequency component of the modulation signal.

The optical modulator according to the present invention is not limited to the embodiment described above. For example, although the optical waveguide 42 provided on the substrate 41 has been described as a Mach-Zehnder type optical waveguide, the present invention is not limited to this description, and other optical modulators including optical waveguides and signal electrode may also be used. In addition, although the case has been described in which the coplanar electrode is used as the modulation electrode 43, other electrodes including at least signal electrodes may be used as the modulation electrode 43.

In the embodiment described above, a case has been described in which the grooves 450a, 450b, and 450c are formed in a single line shape in a direction parallel to the direction A as shown in FIGS. 3 and 4. However, the shape of the groove in the Mach-Zehnder portion is not limited to this shape. For example, as grooves 450d, 450e, and 450f in a Mach-Zehnder portion 421j shown in FIGS. 7 and 8, groove may be formed at predetermined distances and periods in a direction parallel to the direction A. In this case, as shown in FIG. 8, in perspective view (or in top view), the grooves 450d, 450e, and 450f are arranged as perforations at predetermined distances and periods in a direction parallel to the direction A. As the configuration of the Mach-Zehnder portion 421j, an example is shown in which the thin electrodes 46a, 46b, and 46c provided in the Mach-Zehnder portion 421 are not provided and relatively shallow ends are formed by embossing. However, as the configuration shown in FIG. 4, grooves may be formed after forming the thin electrodes.

The grooves 450d, 450e, and 450f do not penetrate the ground electrodes 45d, 45e, and 45f, respectively, as shape in depth direction of the concave grooves. Therefore, at locations where the grooves 450d, 450e, and 450f are formed in the ground electrodes 45d, 45e, and 45f, thin electrodes are formed compared with locations where the grooves 450d, 450e, and 450f are not formed. The formation period (pitch) of the grooves 450a, 450b, and 450c is ¼ or less of the wavelength (wavelength in the band pass filter circuit) of the main frequency component of the modulation signal. Here, the formation period of grooves refers to a distance from the start position of a certain groove to the start position of another groove, which is adjacent to the certain groove in a direction parallel to the direction A, among grooves formed at predetermined distances and periods in the direction parallel to the direction A.

Figure 7:
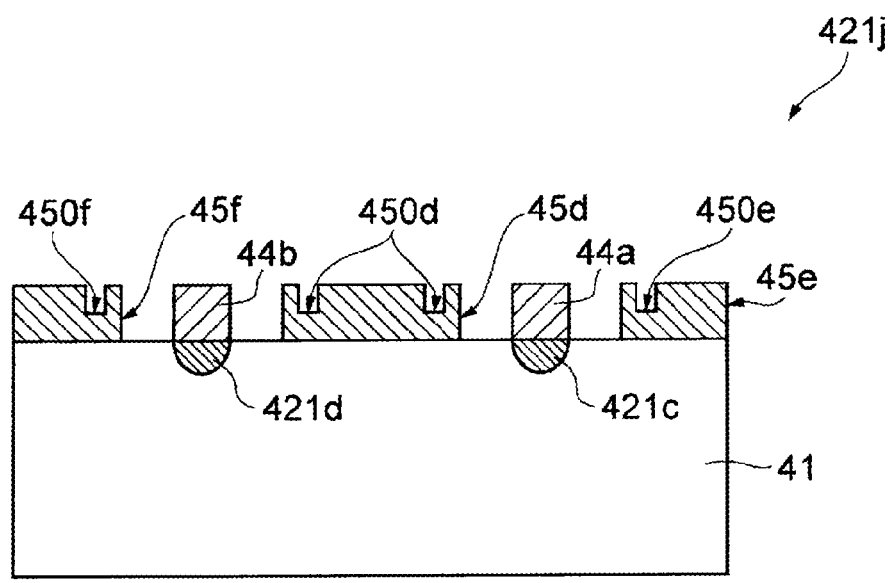
FIG. 7 is a cross-sectional view of another example of the Mach-Zehnder portion.
Figure 8:
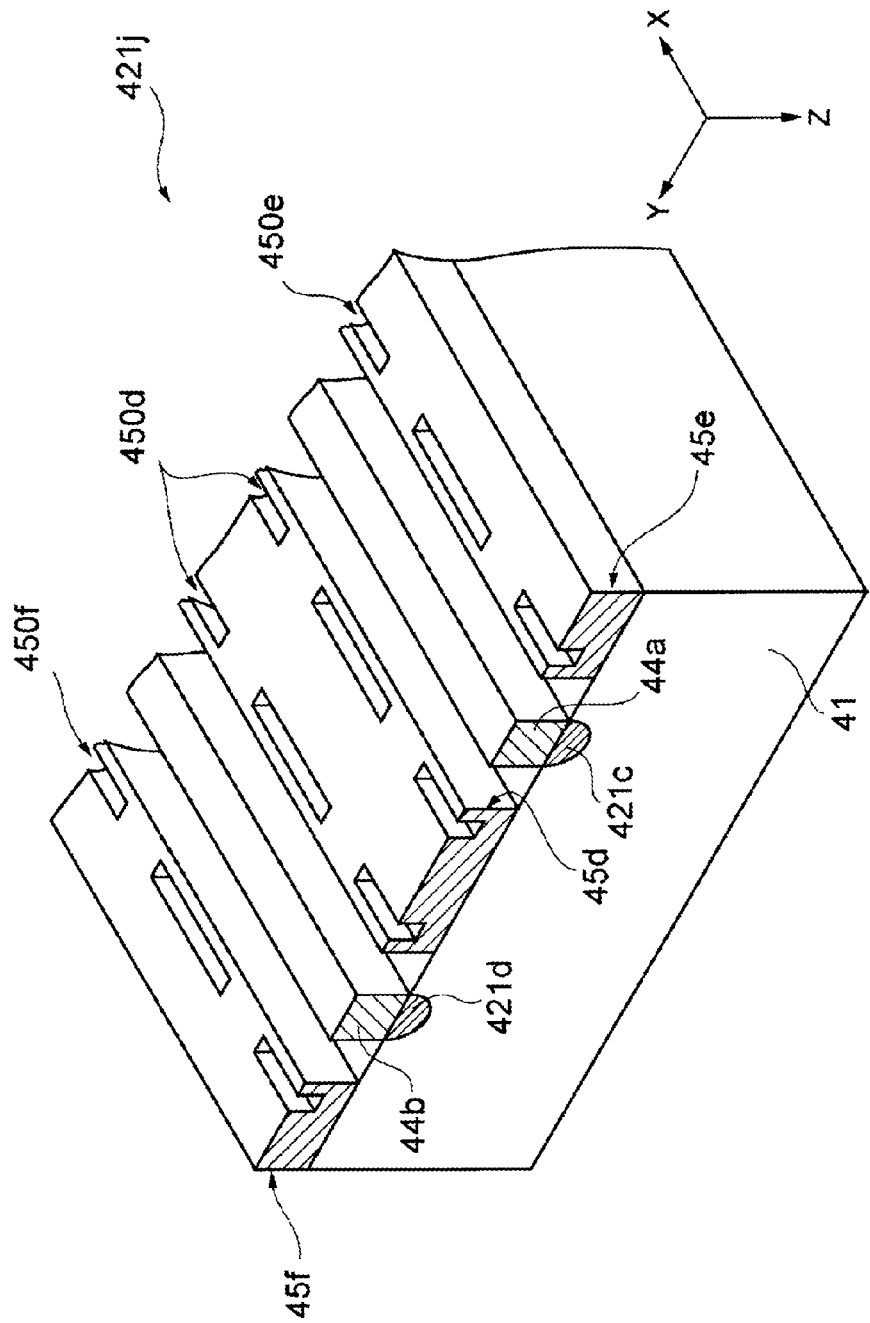
FIG. 8 is a perspective view of the Mach-Zehnder portion shown in FIG. 7.
Figure 9:
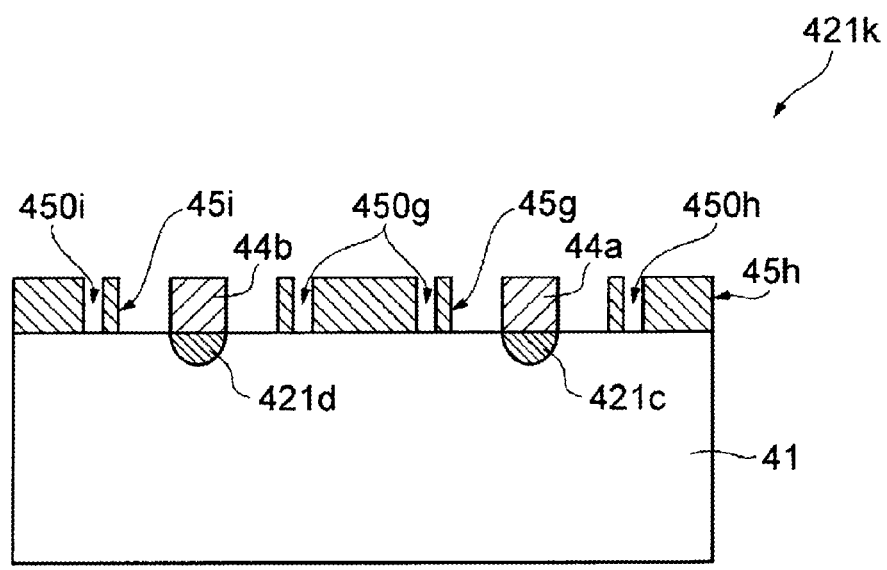
FIG. 9 is a cross-sectional view of another example of the Mach-Zehnder portion.
Figure 10:
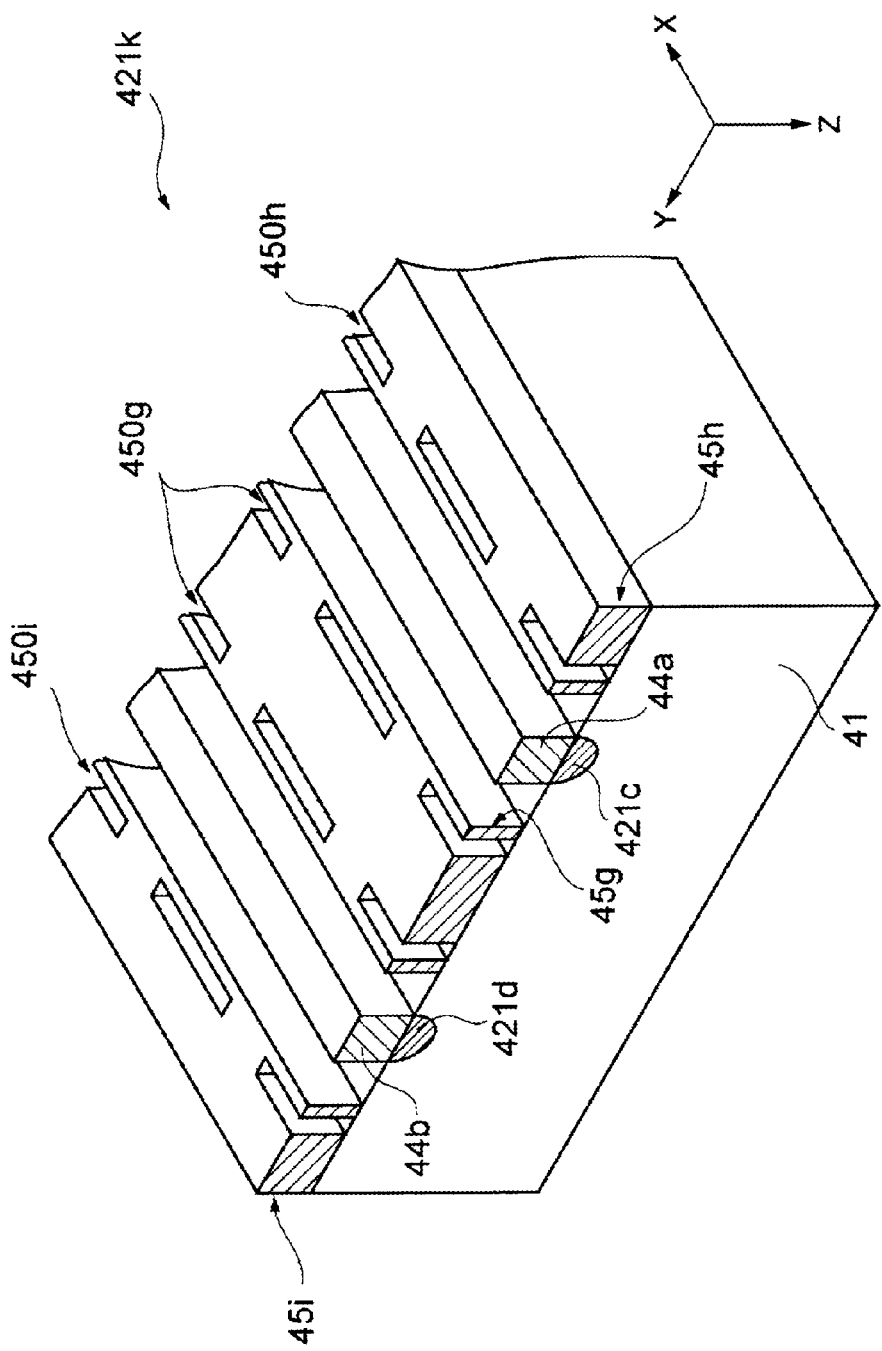
FIG. 10 is a perspective view of the Mach-Zehnder portion shown in FIG. 9.

When grooves are formed as perforations as shown in FIGS. 7 and 8, for example, grooves 450g, 450h, and 450i formed in a Mach-Zehnder portion 421k shown in FIGS. 9 and 10 may be formed at predetermined distances and periods in a direction parallel to the direction A, and the grooves may penetrate the ground electrodes 45g, 45h, and 45i, as shape in depth direction of the concave grooves. In this case, no electrode is existed at the locations where the grooves 450d, 450e, and 450f are formed. Since the electrode having such a configuration can be formed by a single photolithography step and a single plating step, there is a particularly high advantage in manufacturing. Regarding the ratio between the length of a groove and the length of a portion that is left without any groove being formed, as the ratio of the groove increases, the surface area increases. Accordingly, the effect of reducing crosstalk is high. However, the ratio between the length of a groove and the length of a portion that is left without any groove being formed may be set to 20:1 or less so that the signal electrode side portion of the ground electrode functions as a ground electrode. Design considerations for the period are the same as those in the case in which a groove does not penetrate the electrode.

The grooves 450a, 450b, and 450c may be discretely distributed instead of being distributed at predetermined periods. The grooves 450a, 450b, and 450c may have different widths, lengths, shapes, and cross-sectional shapes.

Although the case has been described in which the substrate of the modulator is flat, the effective application of this technique is not limited to the flat substrate. The present invention is also effective for a substrate in which a ridge type waveguide, which is widely used in the LN optical modulator, is formed. Heretofore, in order to simplify the explanation, the form has been described and shown in which the signal electrodes 44a and 44b and the ground electrodes 45a, 45b, and 45c are formed on the same surface and the heights of the signal electrode and the ground electrode are the same. However, it is needless to say that the same effect is obtained even if the signal electrodes 44a and 44b and the ground electrodes 45a, 45b, and 45c are formed on different surfaces of the substrate or even if the heights or thicknesses of the electrodes are different.

REFERENCE SIGNS LIST

1: optical modulator
41: substrate
42: optical waveguide
44a, 44b: signal electrode
45a, 45b, 45c, 45d, 45e, 45f, 45g, 45h, 45i: ground electrode
420, 421, 421j, 421k, 422: Mach-Zehnder portion
421c, 421d: branch waveguide (optical waveguide)
450a, 450b, 450c, 450d, 450e, 450f, 450g, 450h, 450i: groove

The invention claimed is:

1. An optical modulator, comprising:
a substrate;
a plurality of optical waveguides; and
a plurality of modulation electrodes provided on the substrate in order to modulate light propagating through the optical waveguides,
wherein the modulation electrodes include signal electrodes, to which modulation signals are supplied, and ground electrodes,
the signal electrodes include first and second signal electrodes,
the ground electrodes include a first ground electrode provided between the first and second signal electrodes, a second ground electrode provided on the opposite side of the first signal electrode from the first ground electrode provided adjacent to the first signal electrode, and a third ground electrode provided on the opposite side of the second signal electrode from the first ground electrode provided adjacent to the first signal electrode, and a concave groove is formed in each of the first to third ground electrodes.

2. The optical modulator according to claim 1, wherein the groove is formed on an end of each of the first to third ground electrodes.

3. The optical modulator according to claim 1, wherein a distance between the first and second signal electrodes is 300 µm or less.

4. The optical modulator according to claim 1, wherein each of the modulation electrodes is a coplanar electrode or a coplanar strip line electrode.

5. The optical modulator according to claim 1, wherein a distance between the signal electrode and the ground electrode adjacent to each other is 25 µm or more.

6. The optical modulator according to claim 1, wherein the groove extends in a direction parallel to a traveling direction of light propagating through the optical waveguide.

7. The optical modulator according to claim 1, wherein the groove does not penetrate the ground electrode.

8. The optical modulator according to claim 1, wherein the groove penetrates the ground electrode.

9. The optical modulator according to claim 1, wherein the groove is formed at predetermined periods in a direction parallel to a traveling direction of light propagating through the optical waveguide, and a formation period of the groove is shorter than a wavelength of the modulation signal.

* * * * *